Figure 1:
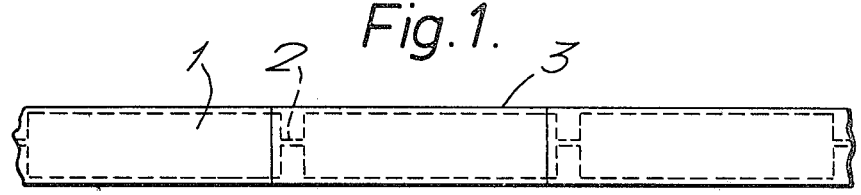

United States Patent [19]

Heasman

[11] 4,320,990
[45] Mar. 23, 1982

[54] OIL BOOM
[75] Inventor: Peter J. R. Heasman, Hale, England
[73] Assignee: Imperial Chemical Industries Limited, London, England
[21] Appl. No.: 804,374
[22] Filed: Jun. 7, 1977
[30] Foreign Application Priority Data
  Jun. 25, 1976 [GB] United Kingdom .............. 26512/76
[51] Int. Cl.³ ........................................... E02B 15/04
[52] U.S. Cl. .................................... 405/66; 114/267;
                                                           405/70
[58] Field of Search .................. 9/8 R; 114/267, 264,
                                     114/266; 61/1 F; 405/63–71
[56]      References Cited
        U.S. PATENT DOCUMENTS
  3,565,257  2/1971  Cavalieri .............................. 61/1 F
  3,667,235  6/1972  Preus .................................... 61/1 F
  3,807,177  4/1974  Oberg .................................. 61/1 F
  3,919,847 11/1975  Ballu ................................... 61/1 F
  4,000,532  1/1977  Nielsen ................................. 9/8 R FOREIGN PATENT DOCUMENTS
  1340742 12/1973  United Kingdom ................ 114/267

Primary Examiner—Trygve M. Blix
Assistant Examiner—D. W. Keen
Attorney, Agent, or Firm—Cushman, Darby & Cushman

[57]          ABSTRACT

An oil boom comprises a plurality of collapsible support members, particularly hinged polypropylene mouldings, detachably strung together, apparatus to hold said support members in the non collapsed state, and a sleeving of water-resistant oil-absorbent material, in particular a laminar pile surfaced thermoplastic material, disposed round the support members, the support members, when in the non collapsed state and bearing the sleeving, being capable of floating on the surface of water.

6 Claims, 9 Drawing Figures

OIL BOOM

This invention relates to oil booms. Oil booms comprise a member designed to float on the surface of water and to substantially contain oil spillages from shipping or other sources.

Oil booms tend to be rather bulky and hence present storage problems when not in use. Likewise they present cleaning difficulties when removed from the water for storage.

It is desirable that each ship be equipped with its own boom that can be disposed around the vessel when moored or in the event of a spillage at sea. Because of bulk and cleaning difficulties this has not heretofore been an economic proposition.

We have divised an oil boom construction that overcomes this difficulty.

Accordingly we provide an oil boom comprising a plurality of collapsible support members detachably strung together, means to hold said support members in the non collapsed state, and a sleeving of a water-resistant oil-absorbent material supported by, and disposed round, said support members, which, when in the non collapsed state and bearing said sleeving, are capable of floating on the surface of water.

The sleeving may be disposable and hence can be renewed every time the boom is assembled for use. In this way cleaning problems are minimised. By making the boom from a plurality of detachable, collapsible support members, storage problems are reduced as the support members, when collapsed, occupy less storage space and may be readily handled.

The sleeving is conveniently in the form of a plurality of tubular sleeves into which the support members are inserted prior to assembly of the boom, or as essembly of the boom proceeds by connection of the support members.

Alternatively the sleeving may comprise a continuous web of the oil absorbent material which is wound round the support members as they are assembled.

The sleeving is preferably a web of a pile surfaced material produced from fibreisable material, particularly a thermoplastic material as described for example in British patent specifications Nos. 1 334 672, 1 378 638, 1 378 639, 1 378 640 and 1 399 095. In the techniques of these specifications, a laminar pile surfaced material is formed by feeding a thermoplastic material and a backing to a heated surface with a thermoplastic material between the backing and the heated surface so that the combination of the thermoplastic and the backing may be peeled away from the heated surface so that the thermoplastic is drawn into fibrils or tufts to provide a pile surface. In this process, the backing may be non porous such as a film but for the present sleeving purposes it is preferably porous because of associated higher absorption of liquids. Suitable porous backings include woven and non woven materials such as hessian, cotton, linen, nylon and polyester fabrics and nets. However, in one embodiment, paper may be used as the backing and the strength of the backing is surprisingly only marginally affected by water. The thermoplastic from which the pile surface is formed may be any of those materials described in the aforesaid patent specifications but is preferably polyethylene. It is also preferred that the pile is at least 2 mm long, most preferably between 4 mm and 12 mm long, the length of pile chosen may be a compromise between strength which decreases with length and mopping power which increases with pile length.

As an example a sleeving was made by feeding a laminate comprising low density polyethylene (65 gm$^2$) on non woven cellulose material (50 gm$^2$) at the rate of 1 m per minute against a heated roll (170° C.), the polyethylene side of the laminate being in contact with the heated roll, the laminate being held in contact against the heated roll by a rubber pressure roll. The laminate was peeled from the heated roll over a bar (diameter 3 mm) located 5 mm from the heated roll, to give a pile surfaced web. The pile so formed was cooled and stabilised by air at ambient temperature blown against the cellulose side of the material into the pile forming area from apertures in the bar. The flow rate of the air was 0.055 m$^3$s$^{-1}$. The resulting material has a long hairy polyethylene pile.

Alternativly a web having soft polyethylene fibrils may be made by a similar technique but omitting the rubber roll and holding the laminate against the heated roll by tension in the laminate and by cooling and stabilising the pile by air at ambient temperature and flow rate 0.055 m$^3$s$^{-1}$ blown onto the pile from a jet located 3 mm from the heated roll and 3 mm from a line drawn through the centre of the heated roll and tangential to the bar, said jet directing the air at an angle of 45° to said line.

Where the backing and support members are porous, flow of water through the boom is not prevented while oil film thereon is absorbed by the sleeving.

The sleeving preferably extends below the support members to form a skirt. For example the sleeving may comprise a tube of the oil absorbent material welded, or othewise fastened, to itself, to form a smaller tube of such a size so as to accommodate the support members and a lateral extension to the smaller tube. This extension is preferably weighted so that, when the assembled boom is floated on the water, the extension depends from the smaller tube round the support members so as to form a skirt hanging down below the oil boom. Such a skirt assists the retention of oil inside the boom by preventing oil globules passing under the floating boom.

The size of the boom will depend on the intended conditions of use. For river work, where there is little or no wave action, a boom of cross sectional diameter of 10 cm or more is desirable, particularly with a skirt, or extension, depending 30 cm or more below the boom. For ocean application, where substantial wave motion may be encountered, a boom of cross sectional diameter of the order of up to 0.5 to 1.0 m may be utilised, with the skirt, if any, proportionately increased in size.

The support members may comprise inflated tubes connected together like a string of sausages, the tubes being provided with valves for inflation and deflation of the tubes. Such tubes may be constructed from any suitable flexible material, e.g. oil resistant rubbers, plastics or plastic coated fabrics. Deflation of the tubes enables them to be readily rolled, folded, or stacked for storage.

Alternatively, and preferably, the support members comprises collapsible frameworks manufactured from a material that floats in water, e.g. wood or low specific gravity plastics such as polyethylene, polypropylene or copolymers of propylene with a minor amount of ethylene. Propylene homo- and co-polymers are preferred.

Such frameworks may collapse by folding at predetermined hinge positions, which in the case of plastic frameworks may be integrally formed. Bracing members are also provided to hold the framework in the noncollapsed condition. Such bracing members may also be connected to, or integral with, the framework when the framework is in the collapsed condition. These bracing members may also serve to connect together the individual frameworks comprising the support members. Thus in one embodiment the individual frameworks may be connected by separate connecting members which also serve as the bracing members. Alternatively the support members may each comprise a framework with an integral connecting member at one end thereof which may be attached to the opposite end of a similar framework.

In yet another alternative, the connecting means between the support members may be separate from the bracing members.

Instead of having connecting members, the support members may simply be strung together by threading onto a rope, which conveniently passes through orifices in the bracing members. Positive connection members are however preferred.

Whatever means is provided to connect the support members, the connection preferably has some degree of flexibility to permit the support members to accommodate wave motion and to permit the boom to bend round in a curve.

The frameworks preferably comprise a plurality of longitudinal struts joined to each other by hinged cross members so that, in the non collapsed condition, the cross members hold the longitudinal struts in spaced relationship, while on collapsing the framework, the cross members fold, about the hinge lines, relative to the longitudinal struts, and, if desired, relative to themselves, to collapse the framework to a compact unit.

Figure 2:
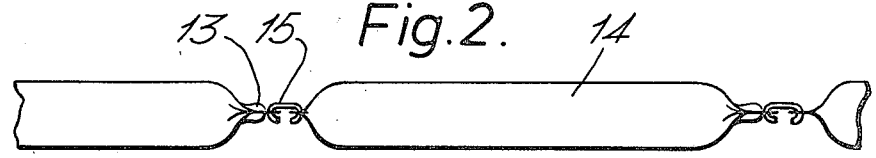
Figure 3:
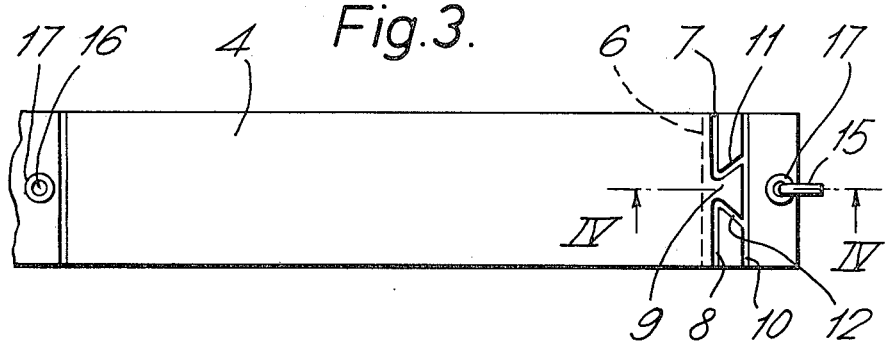

Two embodiment of the invention will now be described with reference to the accompanying drawings wherein FIG. 1 is a diagrammatic plan view of part of an oil boom in accordance with the invention, FIG. 2 is a side elevation of one form of support member shown in the non collapsed state and in conjunction with a connecting member, FIg. 3 is a plan view of the support member of FIG. 2 shown in the collapsed state.

Figure 4:
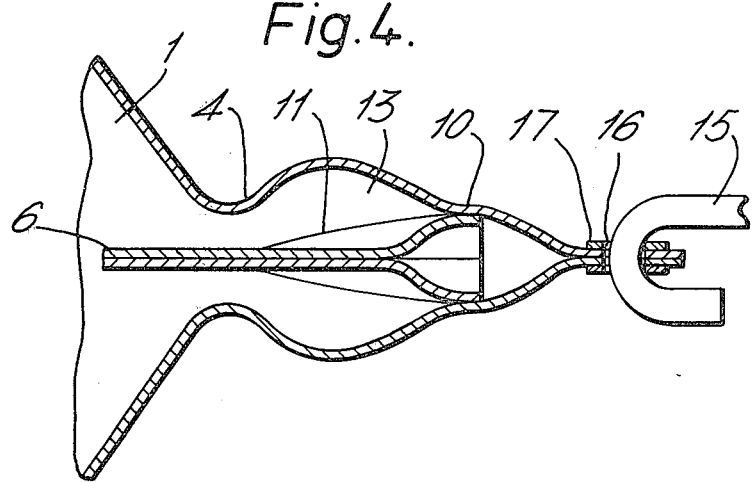
Figure 5:
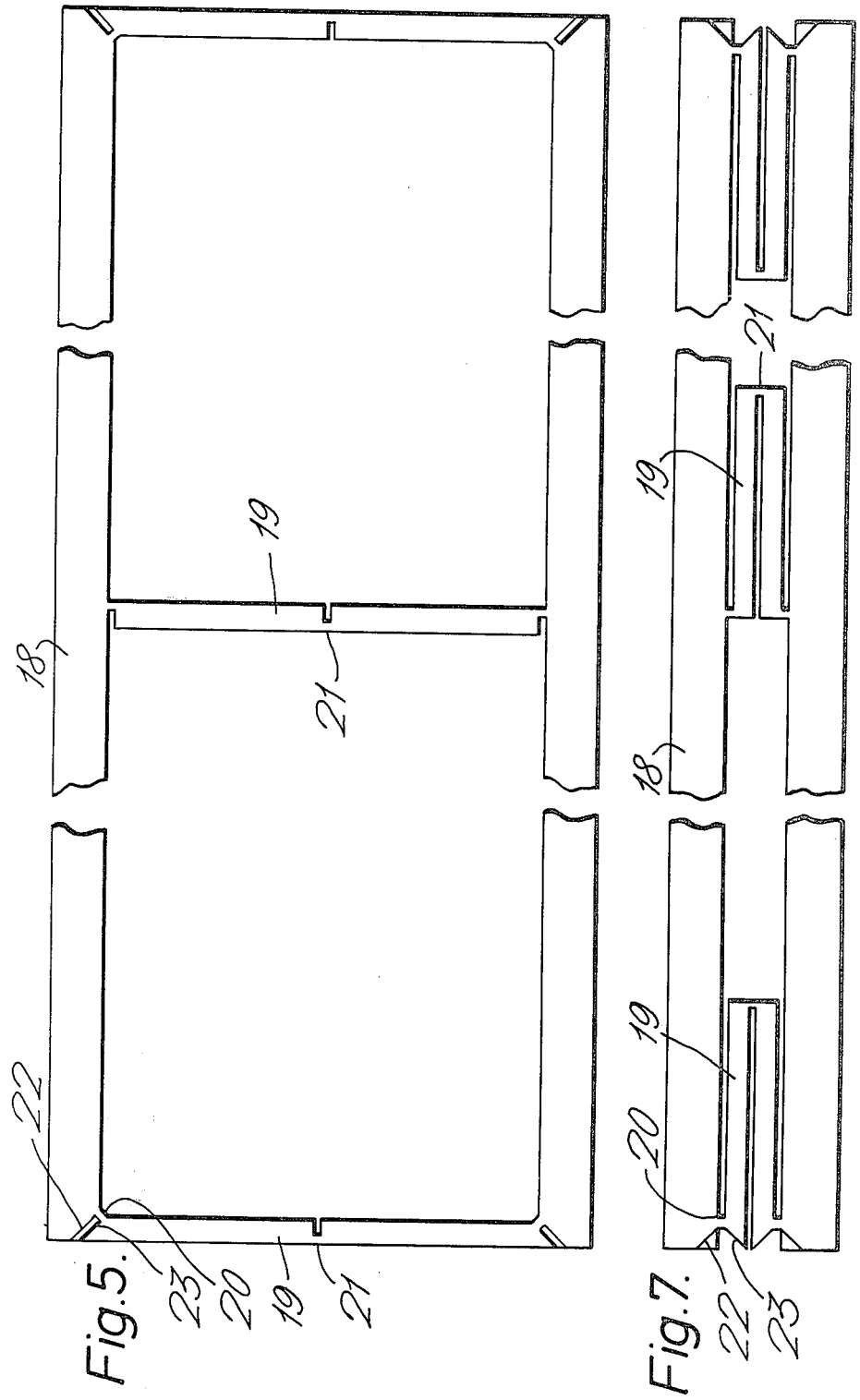
Figure 6:
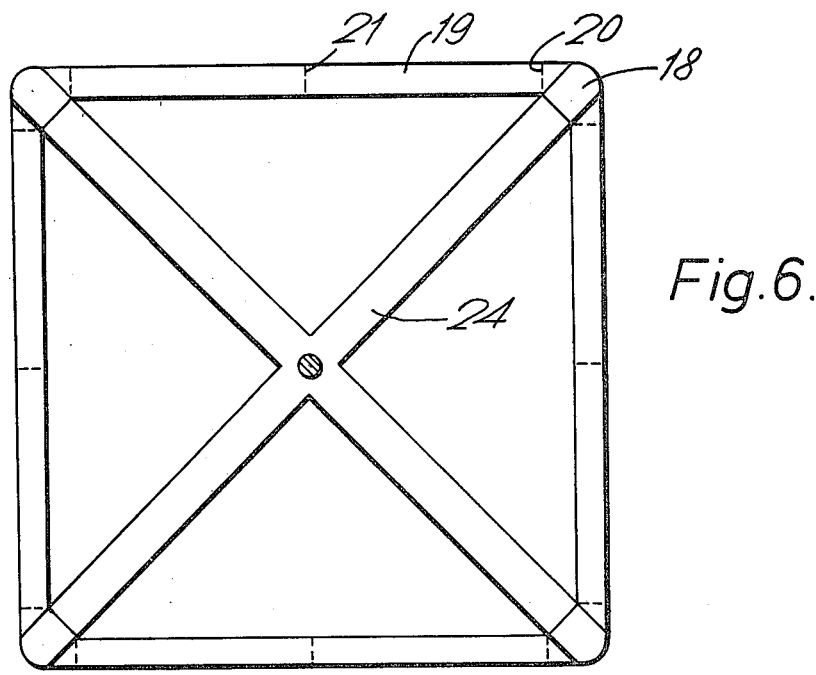
Figure 8:
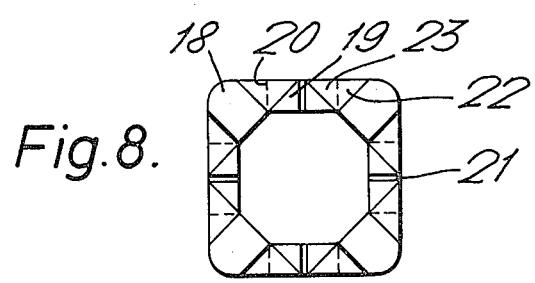
Figure 9:
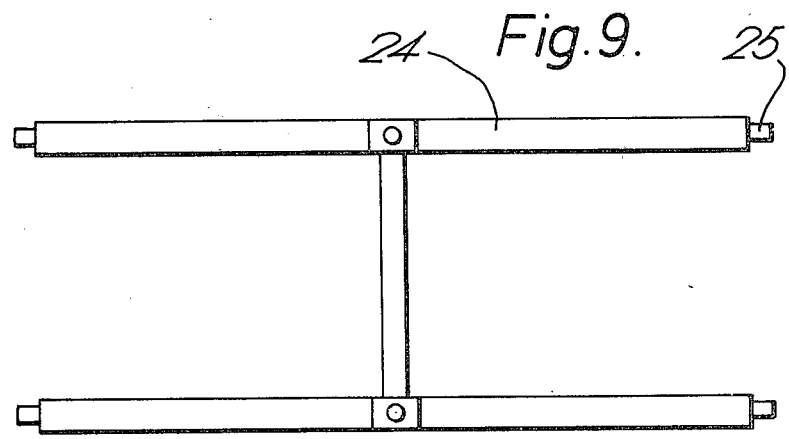

FIG. 4 is a cross section through the valve arrangement of the support member of FIGS. 2 and 3 along the line IV—IV of FIG. 3 but showing the support member in the inflated condition, FIG. 5 is a side elevation of an alternative form of support member shown in the non collapsed state, in conjunction with part of a connecting member, FIG. 6 is an end elevation of the support member and connecting member of FIG. 4, FIGS. 7 and 8 are respectively side and end elevations of the support member of FIGS. 5 and 6 shown in the collapsed state, FIG. 9 is a side elevation of the connecting member used in FIGS. 5 and 6.

In FIG. 1 part of an oil boom is diagrammatically shown. It comprises a series of support members 1 (shown by broken lines) flexibly connected at 2. A sleeving comprising a plurality of tubes 3 of a flexible oil absorbent material is provided round the support members. The tubes are conveniently formed from a pile surfaced laminar web as hereinbefore described welded into tubular sleeves. The sleeves preferably overlap to provide a continuous oil barrier.

In FIGS. 2 and 3 one form of support member is shown. Here the support member comprises an inflatable tubular sausage constructed from a film 4 of a thermoplastic polymeric material such as polyethylene or polyurethane. The film 4 is of lay flat tubular configuration and is sealed at one end by a transverse weld 5 and at the outer end is provided an inflation valve formed with the use of an insert comprising two further pieces of film 6 (or a single further piece of tubular lay flat film). The valve is formed by welding all four thicknesses of the film together along lines 7 and 8 across most of the width of the lay flat tube, leaving only a narrow opening 9 between the film layers in the vicinity of the centre of the lay flat tube width, and welding together each layer of the insert to its adjacent layer of the main tube along lines 10,11, and 12, i.e. line 10 along the outer end of the insert and lines 11 and 12 connecting the extremities of the outer end of the insert with the inner ends of the transverse welds along lines 7 and 8. Preferably all four layers are welded together along at least the inner part of lines 11 and 12, i.e. that part adjacent to the transverse welds along lines 7 and 8.

The adjacent layers of the main tube and insert, thus form pockets 13 bounded by the welds along lines 10, 11 and 12. Upon inflation by passing air under pressure, between the layers 6 of the insert and through the opening 9, e.g. by means of a compressed air hose line, into the body 14 of the tubular film 4, air is forced into these pockets 13 thus compressing the adjacent layers 6 of the insert firmly together upon withdrawal of the air hose line from opening 9 and so sealing the main body 14 of the inflated support member. This valve arrangement, in the inflated condition, is shown in FIG. 4.

The support member may readily be deflated by inserting a probe, preferably hollow, into opening 9 between the layers 6 of the insert, whereupon the inflating air is allowed to escape.

The support members are connected together by links 15 passing through holes 16 punched, or cut, in the ends of the tubular film 4. The holes are suitably protected, e.g. by reinforcing members 17 welded to the film 4.

In the alternative embodiment shown with reference to FIGS. 5 to 9, each support member comprises an injection moulded framework, formed from, e.g. polypropylene, comprising a plurality of logitudinal struts 18 connected to a plurality of cross members 19 by hinges 20. In the embodiment shown each framework has four longitudinal struts connected at each end and in the centre by cross members. It will be appreciated that the framework may be made from any number of struts above three: four are shown to minimise the complexity of the drawings but larger numbers, particularly six or eight are preferred.

Each cross member 19 is provided with a hinge 21 at its centre so that the framework can fold about hinges 20 and 21 to the collapsed state shown in FIGS. 7 and 8. The ends 22,23 of the struts 18, and of the cross members 19 at each end of struts 18, respectively are bevelled. The hinges 20,21 are conveniently formed by the technique described in British patent 1 346 892.

The framework is braced, in the non collapsed state, by means of separately moulded cruciform bracing members 24 having studs 25 projecting from the ends of the arms thereof which snap into corresponding recesses (not shown) in the struts 18.

Similar cruciform bracing members may also be provided to brace the struts at intermediate positions along their length, preferably at positions where there are cross members 19.

The cruciform members 24 bracing the ends of the struts also serve to connect one support member with the next. Thus they may have the configuration shown in FIG. 9 and comprise a pair of cruciform mouldings connected by a tie bar 26 of such cross section and made of such material that the desired degree of flexibility may be donated to the boom.

It will be appreciated that alternative bracing and/or connecting devices can be utilised.

I claim:

1. An oil boom for containing oil spillage at the surface of a body of water comprising: a plurality of collapsible support members; means detachably stringing the support members together, said support members being capable of floating on the surface of the body of water at least when in a non-collapsed state; means to hold said support members in the non-collapsed state; and a separate renewable sleeving of a water-resistant oil-absorbent material supported by, and removably disposed around, all of said support members and said stringing means, said sleeving being a pile-surfaced material formed by feeding a thermoplastic material and a backing to a heated surface with the thermoplastic material between the backing and the heated surface and peeling the combination of the thermoplastic material and the backing away from the heated surface so that the thermoplastic material is drawn into fibrils or tufts to provide a pile surface.

2. An oil boom according to claim 1 wherein the thermoplastic material is polyethylene.

3. An oil boom according to claim 1 wherein the pile surfaced material has a porous backing.

4. An oil boom according to claim 1 in which the pile is at least 2 mm long.

5. An oil boom for containing oil spillage at the surface of a body of water comprising: a plurality of collapsible frameworks manufactured from a material which floats at the surface of the body of water and comprising a plurality of longitudinal struts joined to each other by hinged cross members so that in the non-collapsed condition the cross members hold the longitudinal struts in spaced relationship, the cross members being foldable about predetermined hinge positions to collapse the framework, means to hold said framework in the non-collapsed state; means detachably stringing the frameworks together, and a separate renewable sleeving of a water-resistant oil-absorbent material supported by, and removably disposed around, all of said framework and stringing means.

6. An oil boom as in claim 5 wherein the sleeving comprises a plurality of tubular sleeves.

* * * * *